(12) United States Patent
Naman et al.

(10) Patent No.: US 6,400,050 B1
(45) Date of Patent: Jun. 4, 2002

(54) MOTOR HAVING ROTATING MOVEMENT DETECTION CAPABILITY

(75) Inventors: Robert J. Naman, Wixom; Brian Parker, Troy, both of MI (US)

(73) Assignee: Robert Bosch Corporation, Broadview, IL (US)

( * ) Notice: Subject to any disclaimer, the term of this patent is extended or adjusted under 35 U.S.C. 154(b) by 0 days.

(21) Appl. No.: 09/616,668

(22) Filed: Jul. 14, 2000

(51) Int. Cl.[7] .......................... H02K 11/00; H02K 1/00; H02K 3/00; H02K 21/00; H02K 19/26; H02K 23/02
(52) U.S. Cl. ...................................... 310/68 B; 310/181
(58) Field of Search ............................ 310/68 B, 181, 310/231–237

(56) References Cited

U.S. PATENT DOCUMENTS

| | | | |
|---|---|---|---|
| 4,228,396 A | 10/1980 | Palombo et al. | 324/163 |
| 4,857,784 A | 8/1989 | Mukaekubo | 310/68 B |
| 4,952,830 A * | 8/1990 | Shirakawa | 310/68 B |
| 5,111,098 A | 5/1992 | Peck et al. | 310/268 |
| 5,272,402 A * | 12/1993 | Blaser et al. | 310/68 B |
| 5,279,503 A * | 1/1994 | Propst | 417/319 |
| 5,281,911 A * | 1/1994 | Caron et al. | 324/174 |
| 5,500,564 A * | 3/1996 | Sano et al. | 310/83 |
| 5,517,067 A * | 5/1996 | Sata | 310/68 B |
| 5,596,271 A * | 1/1997 | Lowery | 324/174 |
| 5,998,892 A | 12/1999 | Smith et al. | 310/68 B |
| 6,013,960 A * | 1/2000 | Yoshida | 310/68 B |
| 6,020,663 A | 2/2000 | Furuki | 310/68 B |
| 6,091,171 A * | 7/2000 | Ohishi et al. | 310/68 B |

* cited by examiner

Primary Examiner—Nestor Ramirez
Assistant Examiner—Pedro J. Cuevas
(74) Attorney, Agent, or Firm—Greer, Burns & Crain, Ltd.

(57) ABSTRACT

A motor is disclosed that has the capability of detecting the rotary motion of the motor and to generate electrical signals that are indicative of the speed of operation of the motor. The motor has a magnet that is embedded within the molded resin of the commutator or other parts of an armature and a Hall effect sensor is positioned in close proximity to the rotating magnet to thereby provide an electrical signal that is proportional to the rotating speed of the motor.

8 Claims, 2 Drawing Sheets

MOTOR HAVING ROTATING MOVEMENT DETECTION CAPABILITY

BACKGROUND OF THE INVENTION

The present invention generally relates to electrical motors and more particularly to a motor having the capability to detect its rotational movement.

Electric motors are primarily used to drive fans for engine cooling systems in motor vehicles at the present time and most modem vehicles have a sophisticated in-board engine control unit microprocessor (ECU) that is used to monitor and control the operation of the motor vehicle engine. With the increased sophistication in the operation and control of motor vehicles, it is very desirable to provide an input signal that is indicative of the speed of operation of an engine cooling fan to the ECU so that a diagnostic monitoring and control can be accomplished. The speed of an engine cooling fan can be determinative of an overload condition that may cause a stall of the cooling fan that in turn can cause damage to the cooling fan motor. Such an overload condition can be caused by any number of outside agencies, such as ice or snow pack, or a stick or other debris interfering with the rotation of the fan. It is therefore desirable to monitor the speed of operation of the engine cooling fan in a reliable manner that is not detrimentally affected by large temperature variations.

SUMMARY OF THE INVENTION

Accordingly, it is a primary object of the present invention to provide an improved motor that has rotational movement detection capability that is easily implemented, inexpensive and reliable in its operation A corollary object lies in the provision of the apparatus not requiring any appreciable redesign of motor components or significant changes in the manufacturing process of such motors.

Another object is to provide such an improved motor that utilizes a small unobtrusive magnet that can be placed at various locations on the armature assembly, including the commutator of the motor without affecting the design of the armature or other components of the motor. The motor also includes a sensor that can be easily installed on the brush card that is installed within the housing of the motor near the commutator thereof.

Still another object of the present invention lies in the provision of using a conventional Hall effect sensor that is attached to the brush card and which can be positioned in close proximity to a magnet installed on the armature at one of various locations and which is adapted to produce a single pulse per revolution that can be forwarded to the ECU indicating the speed of operation of the fan.

Another object of the present invention lies in the provision for setting the small magnet in the resin during the resin molding process of the commutator.

These and other objects will become apparent upon reading the following detailed description, while referring to the attached drawings.

DETAILED DESCRIPTION

Broadly stated, the present invention is directed to a motor having the capability for sensing rotary movement, with the motor being of the type which is used in driving an engine cooling fan or the like. The motor is adapted to generate an electrical signal that is indicative of its rotational speed of the motor during operation and such signal can be forwarded to the vehicle's ECU for diagnostic purposes. The motor preferably includes a small magnet which, in several embodiments, is mounted at various locations within the armature and a Hall sensor device which is preferably mounted to and carried by the brush card of the motor. During operation, the movement of the magnet past the Hall effect sensor is sensed by the Hall effect sensor and produces a pulse during every revolution of the motor and this pulse is communicated to an in-board microprocessor or engine control unit (ECU) which can then be used to provide diagnostic or status information of the operation of the engine cooling fan. Such information can then be used to determine if the system is operating properly or if an overload or other fault condition exists which can be used to create alarms and the like so that damage to the fan motor and other components can be prevented.

Figure 1:
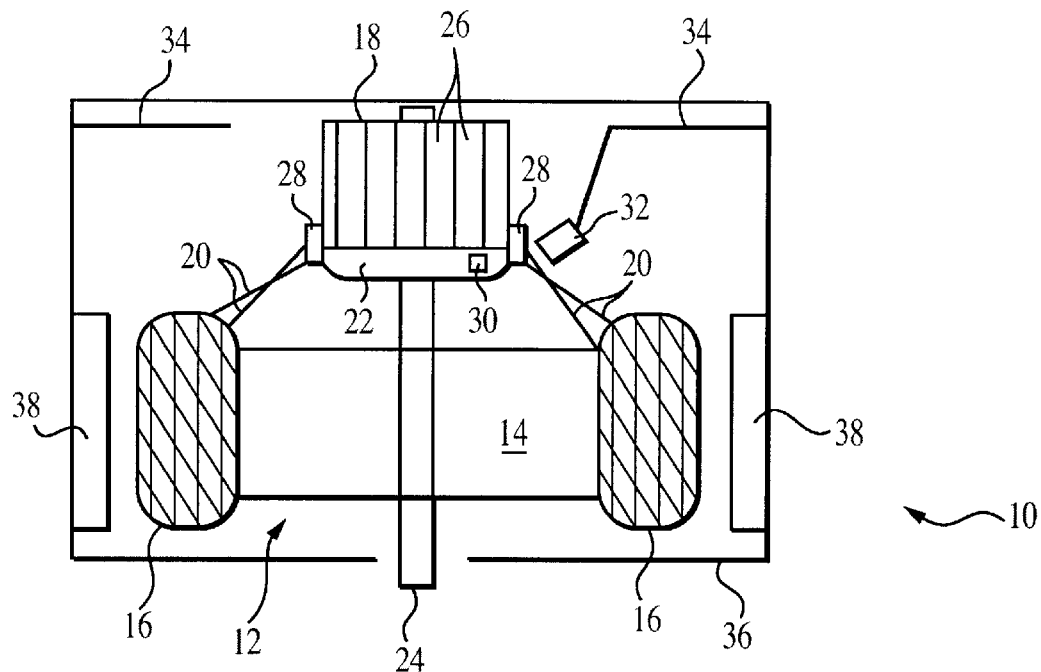
FIG. 1 is a side view with portions cut away of an electric motor with the magnet embedded in the resin compound of the commutator and a stationary sensor attached to the motor brush card in accordance with the preferred embodiment of the present invention.

Turning now to the drawings and particularly FIG. 1, a fan motor is shown generally at 10 and includes an armature, indicated generally at 12, that comprises a lamination core stack 14 and windings 16 which are connected to a commutator 18 through winding portions 20. The commutator 18 is generally cylindrical and has a resin molded portion 22 that is molded during the manufacturing process and is fitted over a shaft 24. The commutator 18 has an outer cylindrical sheath that is preferably made of copper. The inside of the cylindrical sheath is filled with resin during a molding process, and the copper cylinder is then cut into a plurality of bars 26 that are oriented in a direction that is parallel to the axis of the shaft. Lower portions of the commutator bars are bent back to form tangs 28 that loop around the winding portions 20 so as to electrically and mechanically attach them to the individual bars, of which there are preferably 16. It should be understood that the construction of the commutator, in and of itself, is not a part of the present invention and is of conventional construction.

When the resin is molded to the commutator, a small magnet 30 is placed in the commutator preferably slightly below the bottom of the tangs 28 as shown in FIG. 1. By locating the magnet during the molding process at a location that is nearer the laminated core stack 14, it is physically distanced away from the commutator bars where the most heat is produced due to the physical contact of the brushes with the commutator bars. This can result in more reliable operation through a greater temperature range which may extend from approximately −40° C. to approximately +150° C.

It should also be understood that the position of the magnet 30 maybe raised to a position near the top of the commutator and in such position would be coextensive with, but inside of or behind the bars 26. It is preferred that the magnet be relatively small and lightweight, and it has been found that a magnet having dimensions of approximately 8 mm×6 mm×3-½ mm is sufficient to enable in a Hall effect sensor to sense the magnet and generate a pulse, which is shown at 32 as being connected to a brush card 34. The brush card is a part, preferably made of plastic or the like, which carries the commutator brushes and provides an electrical path to side harnesses that are connected to a power source for powering the motor. The sensor 32 is a Hall effect sensor that is adapted to generate a pulse whenever the magnet comes in close proximity to it during rotation of the commutator 18. The entire construction of the motor is located within a motor enclosure or case 36 in which stator magnets 38 are located.

Figure 2:
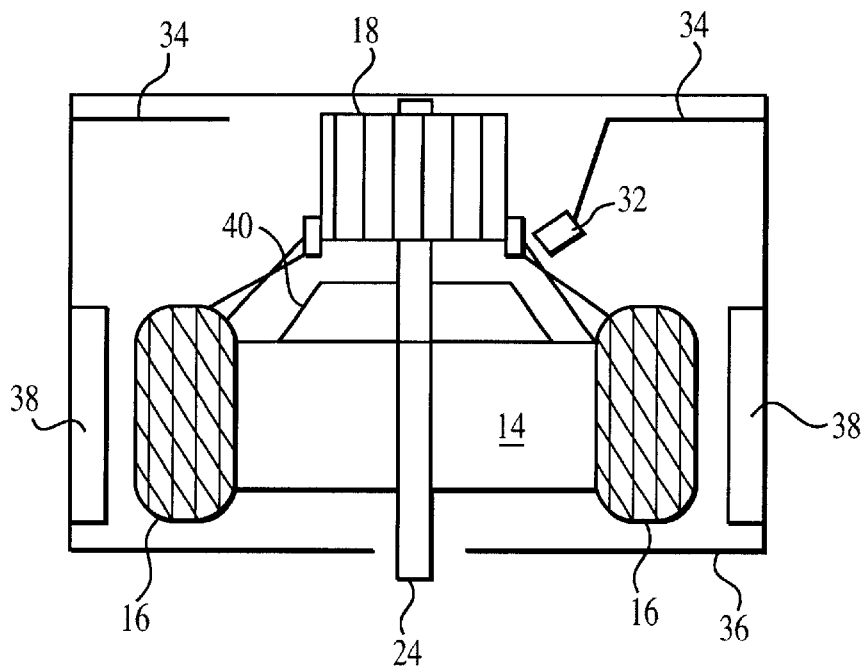
FIG. 2 is a side view with portions cut away of an electric motor showing the location of the magnet located inside a plastic ring located between the commutator and the armature core.
Figure 3:
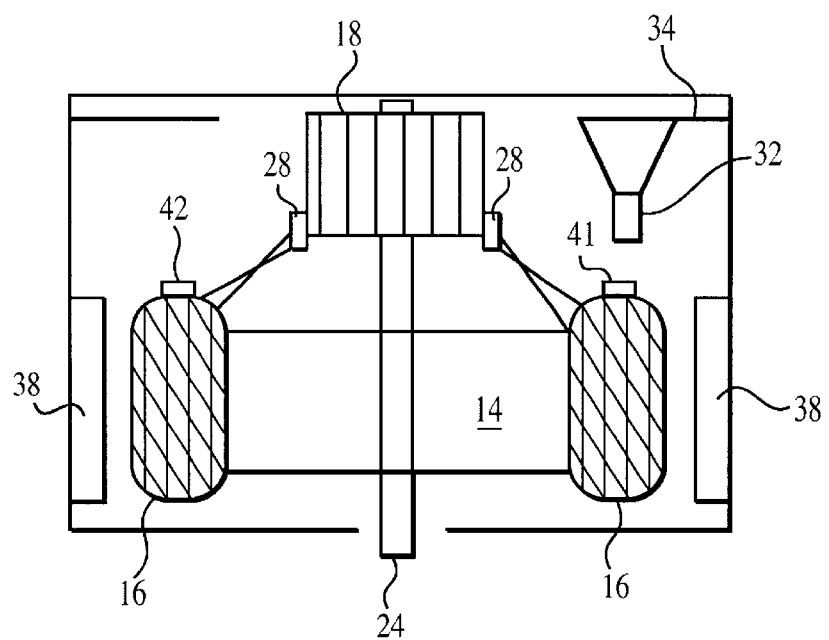
FIG. 3 is a side view with portions cut away of an electric motor showing the location of a magnet attached to the armature winding with a sensor being attached to the brush card; and, FIG. 4 is a partial front view of an engine cooling fan system showing placement of sensor on the fan or guide housing or shroud and the magnet attached to the fan band.

In an alternative embodiment and referring to FIG. 2, a magnet 40 may be embedded in a resin ring that is preferably fit onto the shaft 24 slightly above the laminated stack 14 and below the commutator 18. A Hall effect sensor 32 is again provided and is carried by and mounted to the brush card 34. In another embodiment and referring to FIG. 3, a magnet 41 may be attached to one of the windings 16 and a second magnet or weight balancing object 42 may be provided at the opposite winding from the magnet 41 so that rotational vibration that may otherwise be experienced can be minimized. The sensor 32 is again carried by and connected to the brush card 34.

Figure 4:
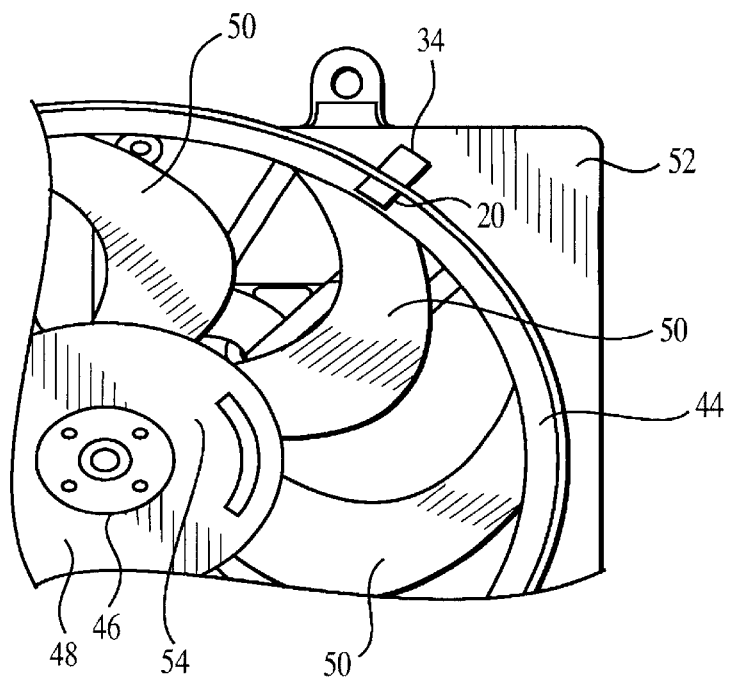

In yet another embodiment and referring to FIG. 4, the magnet 20 may be connected to a band 44 of a fan construction having a hub 46, a circular center portion 48 that is attached to blades 50, and the sensor 34 may be connected to a fan air guide housing portion 52. In another embodiment that is not shown, the magnet may be placed on the underside of the fan at approximate location 54 on the portion 48 near the hub 46, and the sensor 32 can be located on the brush card of the motor.

From the foregoing, it should be understood that a motor having the capability for detecting rotation of a motor has been shown and described which has many desirable attributes. The detection capability involves only a few parts, is easily incorporated into the manufacture of the motor, provides reliable operation and is inexpensive. Because the magnet and sensor are located within the housing 36 of the motor, except for those embodiments shown in FIG. 4, neither component is directly exposed to outside elements and is reliable in its operation over an extended temperature range.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A motor having rotary motion detection capability, said motor comprising:
    an enclosure having a brush card;
    a stator mounted in said enclosure;
    a rotor including an armature assembly having a winding and a commutator;
    an output shaft extending through said rotor;
    a small magnet sized such that it extends only a small fraction around the circumference of said rotor, said magnet being mounted on said rotor adjacent to one of said winding and said commutator; and,
    a magnetic sensing means operatively connected to said enclosure in operational proximity to said magnet that said sensing means can detect said magnet as said rotor rotates and produce an electrical signal responsive to said detection;
    wherein said commutator has a generally cylindrical configuration comprising a plurality of thin elongated bars aligned parallel to the output shaft and extending around the circumference of said cylindrical configuration, the interior of said cylindrical configuration having a resin molded therein, said resin also defining a cylindrical portion extending axially outwardly of the end of said cylindrical configuration toward said armature assembly, said magnet being embedded in the outer periphery of said cylindrical portion.

2. A motor as defined in claim 1 wherein said magnetic is embedded in the outward extension of said resin.

3. A motor as defined in claim 2 wherein said magnetic sensing means is a Hall effect sensor module physically attached to said brush card, said sensor being positioned adjacent to said rotor to detect said magnet as said rotor rotates during operation.

4. A motor as defined in claim 1 wherein said magnet is embedded in said resin interiorly of said elongated bars.

5. A motor having rotary motion detection capability, said motor comprising:
    an enclosure having a brush card;
    a stator mounted in said enclosure;
    a rotor including an armature assembly having a winding and a commutator;
    an output shaft extending through said rotor;
    a small magnet sized such that it extends only a small fraction around the circumference of said rotor, said magnet being mounted on said rotor adjacent to one of said winding and said commutator; and,
    a magnetic sensing means operatively connected to said enclosure in operational proximity to said magnet that said sensing means is adapted to detect said magnet as said rotor rotates and produce an electrical signal responsive to said detection;
    wherein said commutator has a generally cylindrical configuration comprising a plurality of thin elongated bars aligned parallel to the output shaft and extending around the circumference of said cylindrical configuration, the interior of said cylindrical configuration having a resin molded therein, said motor having a ring located around said shaft between said armature assembly and said commutator, said magnet being attached to said ring.

6. A motor as defined in claim 5 wherein said ring comprises a truncated conical resin ring having said magnet embedded therein.

7. A motor as defined in claim 5 further including a fan structure attached to said output shaft, said fan structure having a plurality of fan blades and an outer band extending circumferentially around the outside portion of the fan structure, said band being attached to the outer ends of each blade.

8. A motor having rotary motion detection capability, said motor comprising:
    an enclosure having a stator and a brush card mounted therein;
    a rotor including an armature assembly having a commutator and a winding;
    an output shaft extending through said rotor;
    a small magnet mounted to said commutator, said magnet being sized such that it extends only a small fraction around the circumference of said commutator; and, a magnetic sensing means operatively connected to said enclosure in operational proximity to said magnet that said sensing means is adapted to detect said magnet as said armature assembly rotates and produce an electrical signal responsive to said detection said commutator having a generally cylindrical configuration comprising a plurality of thin elongated bars aligned parallel to the output shaft and extending around the circumference of said cylindrical configuration, the interior having a resin molded therein with the resin forming an axial extension from the end of said cylindrical configuration nearer said armature assembly, said magnet being embedded in the outer portion of said axial extension.

* * * * *